United States Patent
Hazir et al.

(10) Patent No.: US 9,453,298 B2
(45) Date of Patent: Sep. 27, 2016

(54) HOUSEHOLD APPLIANCE

(75) Inventors: Sefa Hazir, Istanbul (TR); Ahmet Ihsan Yuce, Istanbul (TR)

(73) Assignee: ARCELIK ANONIM SIRKETI, Instanbul (TR)

( * ) Notice: Subject to any disclaimer, the term of this patent is extended or adjusted under 35 U.S.C. 154(b) by 480 days.

(21) Appl. No.: 12/594,108

(22) PCT Filed: Mar. 13, 2008

(86) PCT No.: PCT/EP2008/053032
§ 371 (c)(1),
(2), (4) Date: Sep. 30, 2009

(87) PCT Pub. No.: WO2008/119640
PCT Pub. Date: Oct. 9, 2008

(65) Prior Publication Data
US 2010/0109822 A1    May 6, 2010

(30) Foreign Application Priority Data

Mar. 30, 2007   (TR) ................... 2007 02094

(51) Int. Cl.
*H01H 36/00* (2006.01)
*D06F 39/00* (2006.01)
*A47L 15/42* (2006.01)

(52) U.S. Cl.
CPC ......... *D06F 39/005* (2013.01); *A47L 15/4293* (2013.01); *H01H 36/00* (2013.01)

(58) Field of Classification Search
CPC .. A47L 15/4293; D06F 39/005; H01H 36/00
USPC ......................................... 134/57 R; 335/205
See application file for complete search history.

(56) References Cited

U.S. PATENT DOCUMENTS 7,380,423 B1 *   6/2008  Musone ............................ 68/20
2005/0205395 A1 * 9/2005  Dietrich et al. ............. 200/11 R

FOREIGN PATENT DOCUMENTS

DE       19502015 A1    7/1996
GB        2212947 A  *  8/1989 ............. G05B 19/02

* cited by examiner

*Primary Examiner* — Michael Kornakov
*Assistant Examiner* — Katelyn Whatley
(74) *Attorney, Agent, or Firm* — Venjuris PC

(57) ABSTRACT

The present invention relates to a household appliance (1) that can be changed to a mode other than the operating or stand-by modes when desired, but eliminating the possibility of changing to this mode unintentionally by the user.

17 Claims, 2 Drawing Sheets

HOUSEHOLD APPLIANCE

CROSS REFERENCE TO RELATED APPLICATIONS

This application is a 371 of International PCT Application PCT/EP08/53032, filed Mar. 13, 2008, and claims priority under 35 U.S.C. 119(b) to TR2007/02094, filed Mar. 30, 2007.

FIELD

The present invention relates to a household appliance that is prevented to be set by the user to the program mode or the service mode erroneously. In household appliances, from time to time, the appliance has to be set to a program mode or the service mode other than the normal operation mode due to malfunction or program change requirement. However, this process is intended to be carried out by the maintenance personnel rather than the user.

BACKGROUND

In state of the art, changing the appliance to the service mode is done by pressing the buttons on the appliance in a predefined combination with a predefined sequence or by entering a code. In the state of the art, the details of such applications are disclosed in the patent applications of German no DE19505485, European no EP1030235 and no EP0978773, international no WO993296 and no WO9924882.

However, in these applications, the user, even though not aiming to do so, can unintentionally change the appliance to the service mode by pressing the said key combination successively or entering the defined code during the process.

In the German patent application no. DE19850860, in addition to the button combination to be pressed for changing the appliance to the service mode etc., the appliance being brought into a condition, which is unlikely in the usual rest, and operating conditions, for example opening the upper plate is suggested in order to prevent this problem. Since the user will not open the upper plate during normal use, then bringing the machine to the service mode unintentionally will be out of the question. However, in the said implementation, bringing the appliance to a mode which is unlikely in the usual rest and operating conditions can create hardships for the maintenance personnel.

SUMMARY

The aim of the present invention is the realization of a household appliance, which is easily changed to a mode other than the operating or stand-by modes when desired but eliminating the possibility of changing to this mode unintentionally by the user.

The household appliance realized in order to attain the aim of the present invention, is explicated in the claims.

In the household appliance of the present invention, a switch is placed that can be changed to the active position with a magnet, without contacting thereto. When the switch is changed to the active position, the household appliance changes to a special mode other than the normal operating or stand-by modes.

In various embodiments of the present invention, the special mode that the household appliance changes to is a service mode wherein the repair and maintenance operations are implemented or a programming mode for updating of the programs or the factory defaults recorded in the control unit.

In an embodiment of the present invention, the switch is a reed relay, that is, it can be opened or closed by the magnetic field effect.

In an embodiment the present invention is used in a household appliance that can be controlled by a single button. The household appliances that can be controlled by a single button provide convenience by taking off the responsibility from the user for making decision, selecting a program, however problems can arise in changing to the service or programming mode. This problem is eliminated with the present invention.

In an embodiment of the present invention, the switch is disposed at a place not readily reachable by the user in order to completely eliminate the possibility of changing the household appliance to the service or programming mode erroneously.

In an embodiment of the present invention, an indicator is disposed on the household appliance that will not be noticed by the user, so that the maintenance personnel can find the place of the switch easily.

The household appliance of the present invention can be a washing machine, a dishwasher, a dryer or an oven.

BRIEF DESCRIPTION OF THE DRAWINGS

The household appliance designed to fulfill the objective of the present invention is illustrated in the attached figures, where.

DETAILED DESCRIPTION

The elements illustrated in the figures are numbered as follows:
1. Household appliance
2. Switch
3. Indicator
4. Control unit The household appliance (1) comprises a control unit that controls the employment of operating programs selected automatically or by the user and a switch (2) that is activated by a magnet (M) held close and when activated maintains the change to a mode other that the operating or stand-by modes.

In an embodiment of the present invention, the switch (2) is a reed relay that has the feature to open or close with the magnetic field effect.

In another embodiment of the present invention, the switch (2) is a hall sensor that has the feature of detecting the magnetic field.

In an embodiment of the present invention, the household appliance (1) changes to a service mode other than the operating or stand-by modes, ready for the maintenance personnel to start the repair and maintenance process when the switch (2) changes to the active position.

In another embodiment of the present invention, the household appliance (1) changes to a programming mode other than the operating or stand-by modes, ready for updating the programs or the factory default recorded in the control unit when the switch (2) changes to the active position.

In an embodiment of the present invention, the household appliance (1) comprises a display that gives an audio or light signal when the switch (2) changes to the active position.

The household appliance (1) of the present invention can be a washing machine, a dishwasher, a dryer or an oven.

Figure 1:
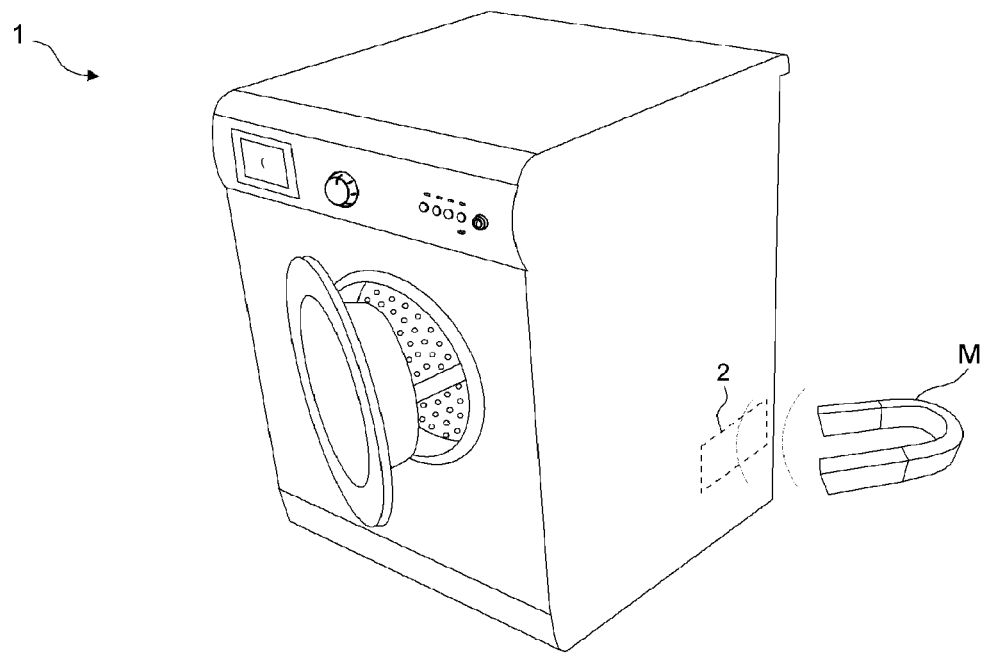
FIG. 1—is the perspective view of a household appliance and a magnet separate from the household appliance.

The person wanting to change the household appliance (1) to a mode other than the operating or stand-by modes, for example the service mode for maintenance activities of the household appliance (1), holds the magnet (M) close to where the switch (2) is situated. The switch (2) changes to the active position by the effect of the magnet (M) for sending a signal or cutting off a signal being sent to the control unit and thus the household appliance (1) is changed to the service mode by the control unit (FIG. 1).

Figure 2:
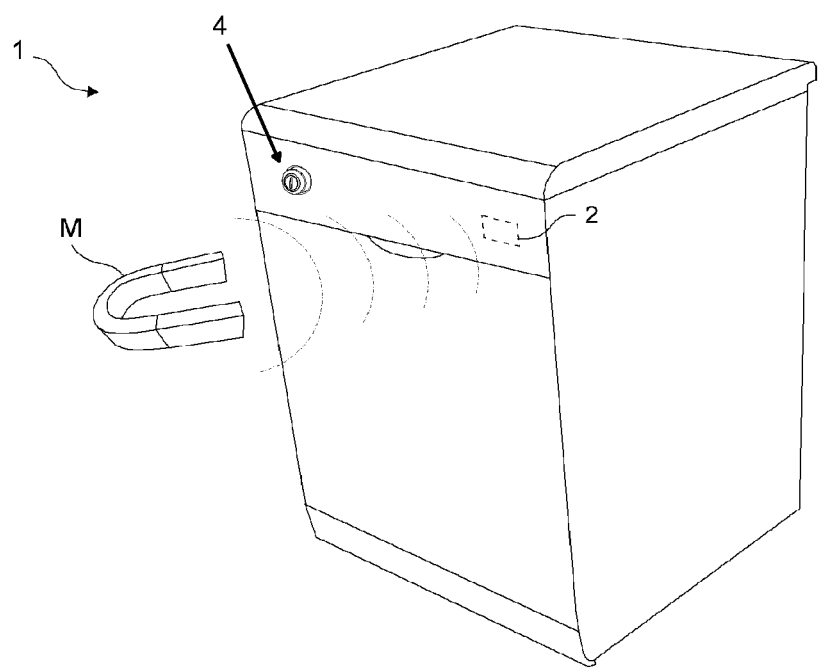
FIG. 2—is the perspective view of another household appliance and a magnet separate from the household appliance.

In an embodiment of the present invention, the household appliance (1) comprises only a single button thereon for controlling the appliance (1). For example, if the said household appliance (1) is a dishwasher, only the program on/off operation is done by the single button and the dishwasher determines the other washing parameters by sensors that detect the amount of soiling, load etc. By means of the present invention, not only all the programs are controlled by a single button but also the adversity of changing the household appliance (1) to a mode other than the operating or stand-by modes is eliminated (FIG. 2).

Figure 4:
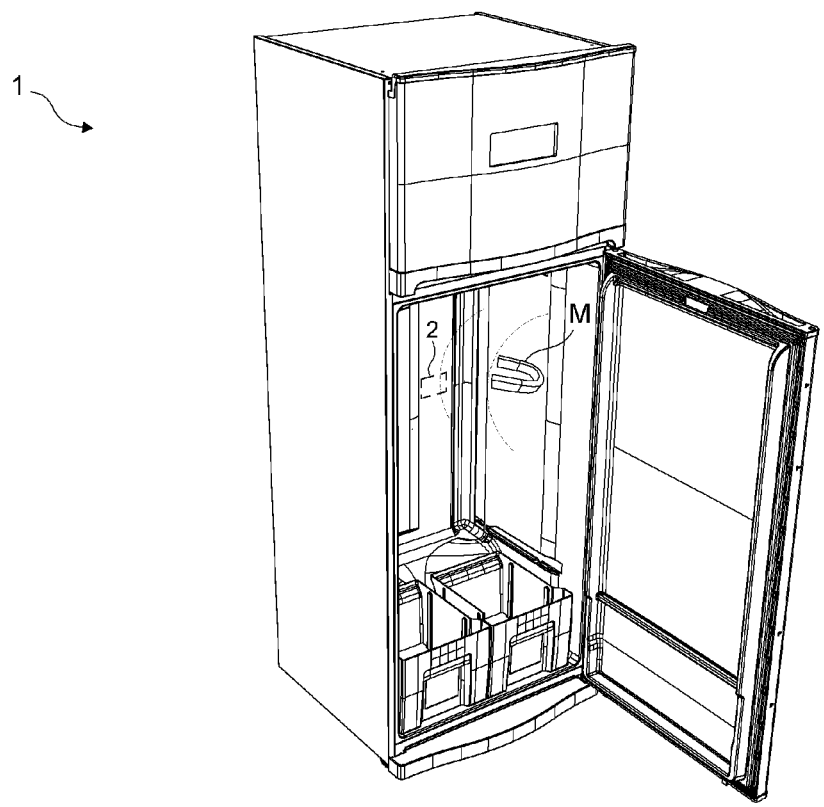
FIG. 4—is the perspective view of another household appliance and a magnet separate from the household appliance.

In an embodiment of the present invention, the switch (2) is situated at a place not readily reachable by the user. For example, if the said household appliance (1) is a refrigerator, the switch (2) is situated at the rear side of the body, if a washing machine then at the bottom of the body. Thus, even if the user gets close to the household appliance (1) with an object that shows a similar effect as a magnet (M), the possibility of activating the switch (2) other than the intention of the user is eliminated (FIG. 1 and FIG. 4).

Figure 3:
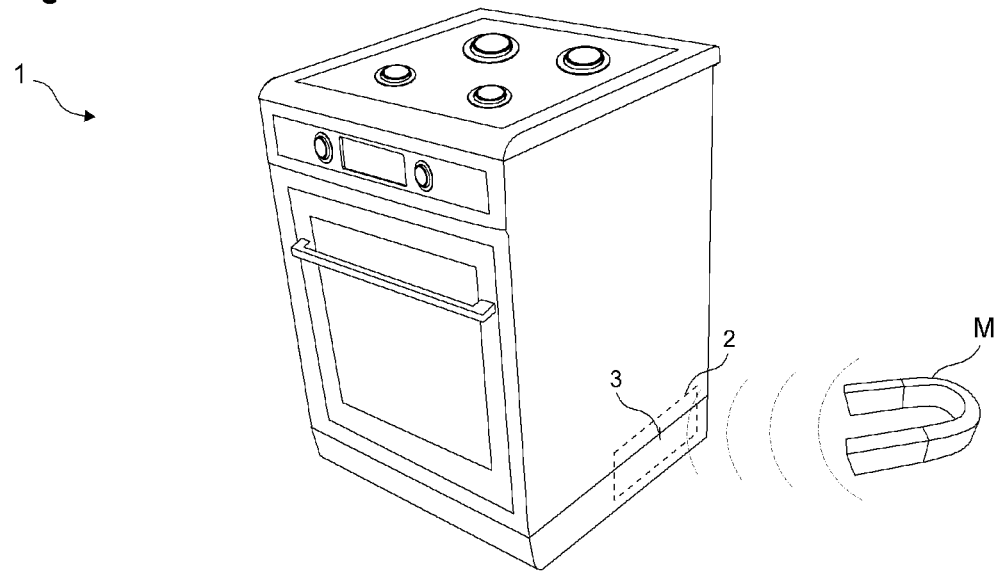
FIG. 3—is the perspective view of yet another household appliance and a magnet separate from the household appliance.

In an embodiment of the present invention, the household appliance (1) comprises an indicator (3) that marks the place of the switch (2) in such a way that the user does not notice. Thus, the maintenance personnel can easily find the place of the switch (2) and hold the magnet (M) towards that region (FIG. 3).

The household appliance (1) of the present invention provides the opportunity for a safer and liberal usage by being prevented from changing to a mode other than the operating or stand-by modes, for example to the service or programming modes, unintentionally, for example by the children who are playing.

The invention claimed is:

1. A household appliance comprising:
   a control unit having a special mode other than operating and stand-by modes for controlling the household appliance; and
   a switch that is activated by a magnet (M) which is separate from the household appliance and wherein the special mode of the control unit is prevented until the switch is activated by the magnet.

2. The household appliance as in claim 1, wherein the switch is a reed relay.

3. The household appliance as in claim 1, wherein the switch is a hall effect sensor.

4. The household appliance as in claim 1, wherein the special mode other that the operating and stand-by modes is selected from the group consisting of a program mode and a service mode; and the switch maintains the change to the service special mode when activated.

5. The household appliance as in claim 1, wherein the household appliance is selected from the group consisting of a washing machine, a dishwasher, a dryer and an oven.

6. The household appliance as in claim 1, wherein the control unit includes a single button that is used for controlling.

7. The household appliance as in claim 1, wherein the switch is situated at a place not readily reachable by a user.

8. The household appliance as in claim 1, further comprising an indicator that marks the place of the switch such that the indicator is more noticeable for maintenance than during use.

9. The household appliance as in claim 7, further comprising an indicator that marks the place of the switch such that the indicator is more noticeable for maintenance than during use.

10. A household appliance and a magnet that is separate from the household appliance, the household appliance comprising:
    a control unit for controlling the employment of operating programs selected automatically or by the user and a switch which is separate from the control unit and whose location is selected from the group consisting of a rear side of the household appliance and a bottom of the household appliance; and
    wherein the switch is activated by the magnet in order to change to a special mode other that an operating mode or stand-by mode.

11. The household appliance as in claim 10 wherein the switch is a reed relay.

12. The household appliance as in claim 10, wherein the switch is a hall effect sensor.

13. The household appliance as in claim 10, wherein the special mode other that the operating or stand-by mode is a service mode and the switch maintains the change to the service mode when activated.

14. The household appliance as in claim 10, wherein the special mode other that the operating or stand-by mode is a programming mode the switch maintains the change to the programming mode when activated.

15. The household appliance as in claim 10, wherein the household appliance is selected from the group consisting of a washing machine, a dishwasher, a dryer and GP an oven.

16. The household appliance as in claim 10, wherein the control unit includes a single button that is used for controlling.

17. The household appliance as in claim 10, further comprising an indicator that marks the place of the switch such that the indicator is more noticeable for maintenance than during use.

* * * * *